United States Patent
Choi et al.

(10) Patent No.: US 12,554,043 B2
(45) Date of Patent: Feb. 17, 2026

(54) WIND VECTOR PREDICTION METHOD USING ARTIFICIAL INTELLIGENCE NETWORK AND ANALYSIS APPARATUS

(71) Applicant: Ewha University—Industry Collaboration Foundation, Seoul (KR)

(72) Inventors: Yong Sang Choi, Seoul (KR); Je Won Kang, Seoul (KR); Hye Sil Kim, Seoul (KR)

(73) Assignee: EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 1204 days.

(21) Appl. No.: 17/367,482

(22) Filed: Jul. 5, 2021

(65) Prior Publication Data

US 2022/0003895 A1   Jan. 6, 2022

(30) Foreign Application Priority Data

Jul. 6, 2020   (KR) ........................ 10-2020-0082595

(51) Int. Cl.
*G01W 1/10*   (2006.01)
*G01W 1/02*   (2006.01)
(Continued)

(52) U.S. Cl.
CPC ................ *G01W 1/10* (2013.01); *G01W 1/02* (2013.01); *G06N 3/045* (2023.01); *G06T 7/11* (2017.01);
(Continued)

(58) Field of Classification Search
CPC .......... G01W 1/10; G01W 1/02; G06N 3/045; G06N 3/044; G06T 7/11;
(Continued)

(56) References Cited

U.S. PATENT DOCUMENTS 11,733,427 B1 *   8/2023   Thielke ................ G06N 3/0442
                                              702/3
2018/0313975 A1 *  11/2018   Chen ....................... G01W 1/10

FOREIGN PATENT DOCUMENTS

KR          10-2042385        11/2019
KR       10-2020-0056085       5/2020
(Continued)

OTHER PUBLICATIONS

Segal-Rozenhaimer M, Li A, Das K, Chirayath V. Cloud detection algorithm for multi-modal satellite imagery using convolutional neural-networks (CNN). Remote Sensing of Environment. Feb. 1, 2020;237:111446. (Year: 2020).*

(Continued)

*Primary Examiner* — Eunhee Kim
(74) *Attorney, Agent, or Firm* — KILE PARK REED & HOUTTEMAN PLLC

(57) ABSTRACT

A wind vector prediction method includes receiving, by an analysis device, a weather video; inputting, by the analysis device, a first base video of a first time point for at least one water vapor absorption channel among a plurality of water vapor absorption channels included in the weather video and a reference video of a time point different from the first time point into a first learning network, and predicting, by the analysis device, a wind vector of a second time point after the first time point for the at least one water vapor absorption channel based on information output from the first learning network.

10 Claims, 7 Drawing Sheets

(51) Int. Cl.
  *G06N 3/045* (2023.01)
  *G06T 7/11* (2017.01)
  *G06V 10/82* (2022.01)
  *G06V 20/13* (2022.01)

(52) U.S. Cl.
  CPC .............. *G06V 10/82* (2022.01); *G06V 20/13* (2022.01); *G06T 2207/10016* (2013.01); *G06T 2207/10032* (2013.01); *G06T 2207/20081* (2013.01); *G06T 2207/20084* (2013.01); *G06T 2207/30192* (2013.01)

(58) Field of Classification Search
  CPC . G06T 2207/10016; G06T 2207/10032; G06T 2207/20081; G06T 2207/20084; G06T 2207/30192; G06V 10/82; G06V 20/13
  See application file for complete search history.

(56) References Cited

FOREIGN PATENT DOCUMENTS

| KR | 20200057844 A | * | 5/2020 | ............. H04N 7/014 |
| KR | 102360577 B1 | * | 2/2022 | ............. G06T 7/174 |

OTHER PUBLICATIONS

Francis, Alistair, Panagiotis Sidiropoulos, and Jan-Peter Muller. "CloudFCN: Accurate and robust cloud detection for satellite imagery with deep learning." Remote Sensing 11.19 (2019): 2312. (Year: 2019).*

Cao J, Farnham DJ, Lall U. Spatial-temporal wind field prediction by Artificial Neural Networks. arXiv preprint arXiv:1712.05293. Dec. 13, 2017. 39 Pages (Year: 2017).*

Rüttgers M, Lee S, You D. Prediction of typhoon tracks using a generative adversarial network with observational and meteorological data. arXiv 2018. arXiv preprint arXiv:1812.01943. 18 Pages. (Year: 2018).*

Somyoung Kim, et al., "Optimization of Mesoscale Atmospheric Motion Vector Algorithm Using Geostationary Meteorological Satellite Data", Atmosphere. Korean Meteorological Society, vol. 22, No. 1, pp. 1-12 (2012).

* cited by examiner

WIND VECTOR PREDICTION METHOD USING ARTIFICIAL INTELLIGENCE NETWORK AND ANALYSIS APPARATUS

FEDERALLY SPONSORED RESEARCH OR DEVELOPMENT

This invention was made with Korean government support under Project Registration No. 1365003435 and Grant No. KMI2021-00610 awarded by Korea Meteorological Institute, Promising Private Weather Service Technology Development Program, project entitled "Commercialization of weather disaster warning system for developing countries," host organization Ewha University-Industry Collaboration Foundation, period of study from April 2021-March 2022.

CROSS-REFERENCE TO RELATED APPLICATION

This application claims priority from and the benefit of Korean Patent Application No. 10-2020-0082595, filed on Jul. 6, 2020, which is hereby incorporated by reference for all purposes as if fully set forth herein.

BACKGROUND OF THE INVENTION

Field of the Invention

The technique described below relates to a method of predicting a wind vector from a weather video using a learning model.

Background of the Related Art

Meteorology uses ground observation, aerial observation, and satellite observation to classify clouds, calculate precipitation, and calculate wind fields. Atmospheric motion vectors (AMVs) provide wind information in real-time for the entire Earth area. The atmospheric motion vectors are used as real-time weather analysis and numerical forecast model data. The wind vector represents the speed and direction of wind. The wind vector may be obtained by calculating displacement using two satellite videos.

SUMMARY

A water vapor absorption channel in a satellite video may be used to calculate a wind vector based on the characteristics of water vapor. However, the water vapor absorption channel can be used for wind vector calculation only in a clear sky region without clouds.

The technique described below is intended to provide a technique of predicting a wind vector using an artificial intelligence network that uses satellite videos as input data.

To accomplish the above object, according to one aspect of the present invention, there is provided a wind vector prediction method comprising the steps of: receiving, by an analysis device, a weather video; inputting, by the analysis device, a first base video of a first time point for at least one water vapor absorption channel among a plurality of water vapor absorption channels included in the weather video and a reference video of a time point different from the first time point into a first learning network; and predicting, by the analysis device, a wind vector of a second time point after the first time point for the at least one water vapor absorption channel based on information output from the first learning network.

According to another aspect, there is provided a wind vector prediction method comprising the steps of: receiving, by an analysis device, a video of a channel indicating a radiance of the ground and a video of a water vapor absorption channel; inputting, by the analysis device, the video of the channel indicating the radiance of the ground into a segmentation network to distinguish a cloud region and a cloudless region in the video; generating, by the analysis device, a wind vector for the cloudless region using the video of the water vapor absorption channel; inputting, by the analysis device, a first base video of a first time point for the water vapor absorption channel and a reference video of a time point different from the first time point into a first learning network; and predicting, by the analysis device, a wind vector of a second time point after the first time point for the water vapor absorption channel based on information output from the first learning network.

Since the technique described below can predict a wind vector even when it is difficult to predict the wind vector as there is a cloud region, it may contribute to accurate weather forecast.

DETAILED DESCRIPTION OF THE ILLUSTRATED EMBODIMENTS

Figure 1A:
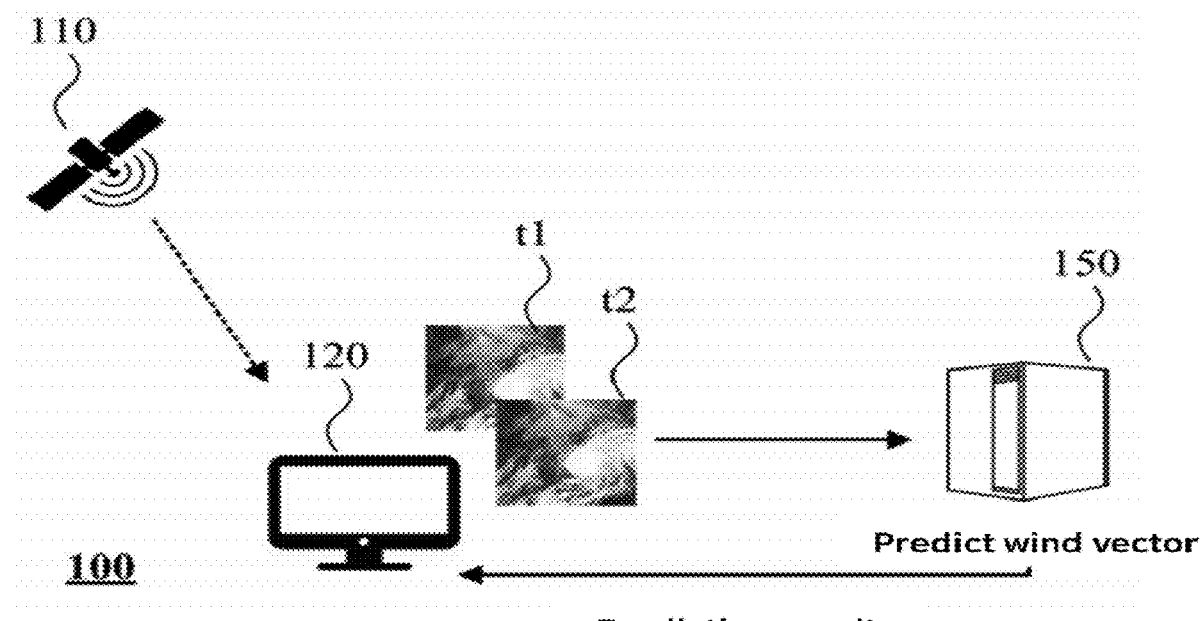
FIG. 1(A) and FIG. 1(B) are views showing an example of a system for predicting a wind vector using satellite videos.

Since the technique described below may be changed diversely and have various embodiments, specific embodiments will be illustrated in the drawings and described in detail. However, it should be understood that this is not intended to limit the technique described below to specific embodiments, but to include all modifications, equivalents, and substitutes included in the spirit and scope of the technique described below.

Although terms such as first, second, A, and B may be used to describe various components, the components are not limited by the terms, and the terms are only used for the purpose of distinguishing one component from others. For example, a first component may be named as a second component, and similarly, a second component may also be named as a first component without departing from the scope of the present invention. The term 'and/or' includes a combination of a plurality of related and described items or any one item among the plurality of related and described items.

Singular expressions among the terms used in this specification should be understood to include plural expressions unless the context is clearly interpreted otherwise, and it should be understood that terms such as "comprises" and the like mean presence of the described features, numbers, steps, operations, elements, parts or combinations thereof, and do not to exclude the possibility of presence or addition of one or more other features, numbers, steps, operations, components, parts or combinations thereof.

Prior to detailed description of drawings, it is intended to clarify that classification of components in this specification is merely classifying the components according to the main function that each component is responsible for. That is, two or more components described below may be combined into one component, or one component may be divided into two or more components for each subdivided function. In addition, each of the components described below may additionally perform some or all of the functions of the other components, in addition to the main function that each component is responsible for, and it goes without saying that part of the main function that each component is responsible for may be exclusively performed by other components.

In addition, in performing a method or an operation method, the processes configuring the method may occur in an order different from the specified order unless a specific order is clearly described in context. That is, each process may occur in the same order as specified, may be performed simultaneously in practice, or may be performed in a reverse order.

A satellite video means a video including weather information. The technique described below is a technique of predicting a wind vector using satellite videos.

In the satellite video, a region where clouds exist is named as a cloud region, and a region without clouds is named as a clear sky region.

The technique described below predicts a wind vector using a learning model. As is widely known, there are many different learning models. Hereinafter, it is assumed that a wind vector is predicted using an artificial neural network, which is a representative learning model. Meanwhile, there are many different artificial neural network models. For example, the artificial neural network includes a convolutional neural network (CNN), an auto encoder, a convolutional encoder/decoder, a recurrent neural network (RNN) and the like. Hereinafter, a learning model that processes satellite videos is named as a learning network. The type and structure of the learning network may be diverse.

Hereinafter, a subject that predicts a wind vector using an artificial neural network is named as an analysis device. The analysis device corresponds to a computer device capable of predetermined data processing and operation. For example, the analysis device may be implemented as a device such as a PC, a smart device, a server, or the like. The analysis device processes input videos using a previously learned artificial neural network model. The analysis device may generate interpolated videos or extrapolated videos based on the input videos.

The analysis device may predict a wind vector using at least one of various forms of satellite videos. Hereinafter, for convenience of explanation, it will be described based on the observation data of Chollian 2A used in Korea.

The observation data of the Advanced Meteorological Imager (AMI) mounted on the Cheollian 2A (launched in December 2018, GK2A) may be used as input data. Table 1 shown below describes the center wavelength, resolution, and main uses of 16 channels of the AMI. As described below, the satellite video may include data of various channels.

TABLE 1

| | Channel | Center frequency (μm) Minimum | Maximum | Resolution (km) | Utilization (Meteo-France, 2013) |
|---|---|---|---|---|---|
| VNIR | 1 | 0.4310 | 0.4790 | 1 | dust |
| | 2 | 0.5025 | 0.5175 | 1 | |
| | 3 | 0.6250 | 0.6600 | 0.5 | cloud, water, land |
| | 4 | 0.8495 | 0.8705 | 1 | land/sea mask, vegetation |
| | 5 | 1.373 | 1.383 | 2 | cirrus |
| | 6 | 1.601 | 1.619 | 2 | cloud phase |
| MWIR | 7 | 3.740 | 3.960 | 2 | cloud screening, smoke |
| | 8 | 6.061 | 6.425 | 2 | water vapor |
| | 9 | 6.890 | 7.010 | 2 | water vapor |
| | 10 | 7.258 | 7.433 | 2 | water vapor |
| | 11 | 8.440 | 8.760 | 2 | cloud phase |
| LWIR | 12 | 9.543 | 9.717 | 2 | |
| | 13 | 10.25 | 10.61 | 2 | cloud particle size |
| | 14 | 11.08 | 11.32 | 2 | SST, cloud, rainfall, dust, . . . |
| | 15 | 12.15 | 12.45 | 2 | low-level WV, volcanic ash |
| | 16 | 13.21 | 13.39 | 2 | CO2 |

A technique of predicting a wind vector using four channels among the 16 channels will be described. Three channels (channel 8, channel 9, and channel 10) are water vapor absorption channels, and the other channel (channel 13) is a channel that is in the infrared atmospheric window region. Hereinafter, the water vapor absorption channels are used as basic input data for predicting the wind vector, and the channel of the infrared atmospheric window region is used as a data for determining presence of clouds. Each channel will be described briefly.

(1) Channel 8

Channel 8 having a center wavelength of 6.2 μm is an infrared observation channel known as an "upper water vapor absorption channel". Therefore, the channel is useful to grasp the wind of the upper layer, the trajectory of the jet stream, and the like. In addition, it is helpful to monitor highly-developed hurricanes, movement of storms, and severe weather, and also helpful to measure the amount of water vapor in the upper layer. The analysis device may calculate the wind vector of the upper layer by monitoring the water vapor in channel 8. However, since the optically thick cloud region in this channel interferes with observation of the characteristics of water vapor in the atmosphere, it difficult to calculate the wind vector.

(2) Channel 9

It is an infrared observation channel known as the "middle layer water vapor absorption channel" having a center wavelength of 6.9 μm. The function is the same as that of channel 8, and the difference is the observed altitude. Therefore, the analysis device may calculate the wind vector of the upper layer by monitoring the water vapor in channel 9. However, since the optically thick cloud region in this channel interferes with observation of the characteristics of water vapor in the atmosphere, it difficult to calculate the wind vector.

(3) Channel 10

It is an infrared observation channel known as the "lower layer water vapor absorption channel" having a center wavelength of 7.3 μm. That is, this channel mainly shows water vapor characteristics on the side of 500 to 750 hPa (in the case of middle latitude). The analysis device may calculate the wind vector of the upper layer by monitoring the water vapor in channel 10. However, since the optically thick cloud region in this channel interferes with observation of the characteristics of water vapor in the atmosphere, it may be difficult to calculate the wind vector.

(4) Channel 13

It is an atmospheric window infrared channel having a center wavelength of 10.4 μm, which absorbs least ozone and water vapor in the atmosphere among the 16 channels of the AMI. Since it reflects the characteristics of an observation target without being affected by any gas in the atmosphere, identification, classification or the like of clouds is possible. The analysis device may use channel 13 to distinguish a cloud region and a clear sky region.

Input Data Preprocessing

Satellite video data needs to be preprocessed in a predetermined way in advance. In the learning network, input data may go through the following preprocessing process.

The equation shown below is used to convert a digital count value observed from a satellite into a meaningful physical quantity (reflectance/radiance), and the required coefficients are as shown in Table 2.

$$Radiance_i = Gain_i \times Count_i + Offset_i \quad (i=\text{channel number}) \quad \text{[Equation 1]}$$

TABLE 2

| Channel | Gain | Offset |
|---|---|---|
| 8 | −0.0108914673328399 | 44.177703857421800000 |
| 9 | −0.00818779878318309 | 66.74807739257810000 |
| 10 | −0.0096982717514038 | 79.060852050781200000 |
| 13 | −0.01981969550251960 | 161.58013916015600000 |

The radiance may be converted into a predetermined brightness temperature. The equation for converting the radiance into a brightness temperature is as shown below in Table 3.

TABLE 3

| Calibration Equation_IR | |
|---|---|
| Radiance to Brightness | |
| Radiance = Gain * Count + Offset | [mW/m^2/sr/cm^−1] |
| Te = (hc/k*(v*100))/1{ln( (2hc^2) * (v*100)^3/(R*(10^−5)) +1) | [K] |
| Tb = c0 + c1*Te + c2*Te**2 | [K] |
| Light speed = 2.9979245800E+08 | [m/s] |
| Planck's constant (h) = 6.6260695700E−34 | [m 2kg/s] |
| Boltzmann constant (k) = 1.3806488000E−23 | [m 2kg/s2/K] |
| c1 (2hc**2) = 1.1910428681E−16 | |
| c2 (hc/k) = 1.4387769600E−02 | |

Going through the preprocessing like this, the video of each channel is converted into a video having a predetermined brightness.

FIG. 1 is a view showing an example of a system 100 for predicting a wind vector using satellite videos.

FIG. 1(A) is a view showing an example of an analysis device of an analysis server form. The system 100 includes a satellite 110, a client 120, and an analysis server 150. The satellite 110 acquires the satellite video described above and transmits it to the client 120. If necessary, the client 120 may transmit the satellite video to the analysis server 150 after preprocessing the video. The client 120 transmits satellite videos t1 and t2 of different time zones to the analysis server 150. Two videos are expressed for convenience of explanation. The client 120 transmits videos of time points adjacent to a time point when wind vector prediction is needed to the analysis server 150. The analysis server 150 may preprocess input data. The analysis server 150 predicts the wind vector at a specific time point using the input video. The analysis server 150 may transmit a prediction result to the client 120.

Figure 1B:
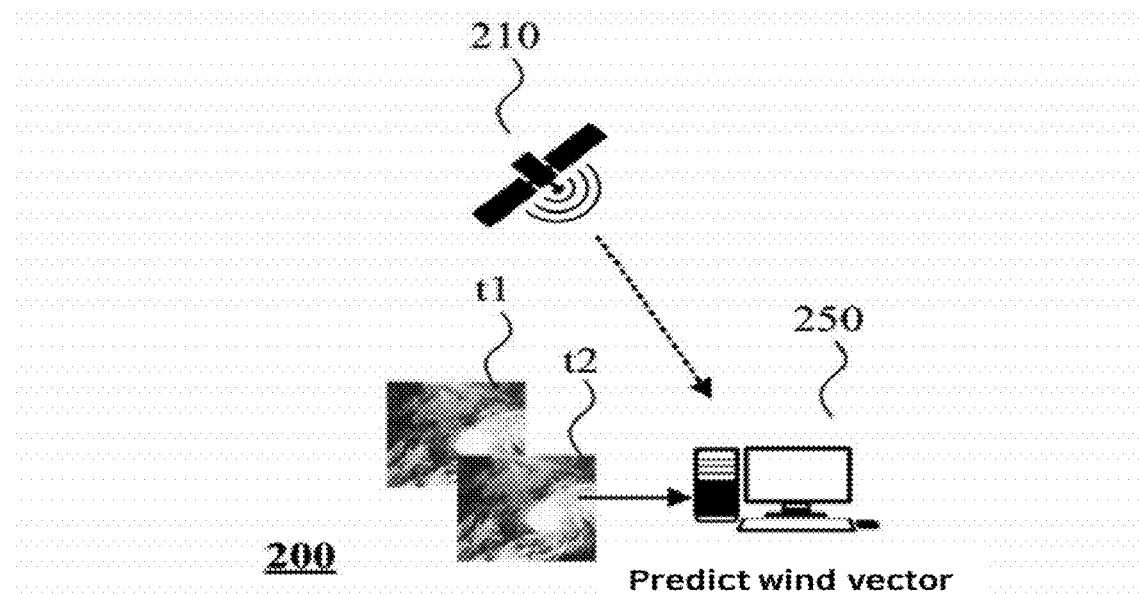

FIG. 1(B) is a view showing an example of an analysis device of a computer terminal form. The system 200 includes a satellite 210 and a computer device 250. The satellite 210 acquires the satellite video described above and transmits it to the computer device 250. If necessary, the computer device 250 may preprocess the satellite video. The computer device 250 predicts a wind vector using satellite videos t1 and t2 of different time zones. The computer device 250 predicts a wind vector at a specific time point using videos at time points adjacent to a time point when wind vector prediction is needed. The computer device 250 may output a prediction result.

The learning network may output information on the wind vector in the form of a video or a flow vector. The learning network may have any one of various structures. Hereinafter, for convenience of explanation, it will be described focusing on a convolutional encoder-decoder structure or a modified convolutional encoder-decoder structure.

Figure 2:
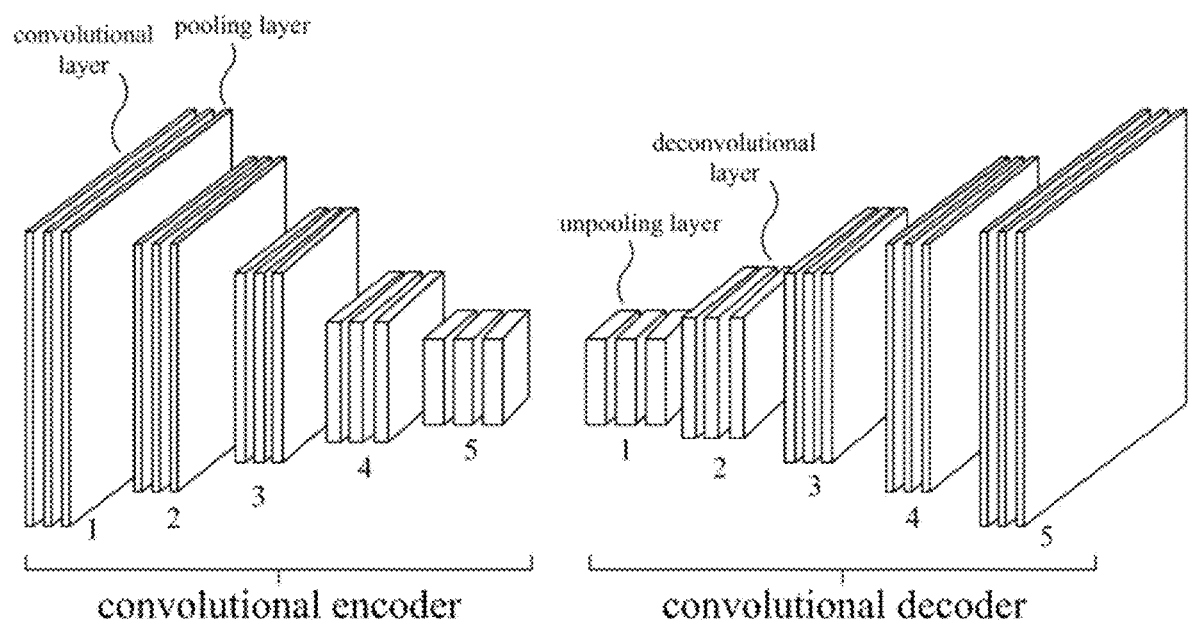
FIG. 2 is a view showing an example of a convolutional encoder-decoder.

FIG. 2 is a view showing an example of a convolutional encoder-decoder. The convolutional encoder-decoder is configured of a convolutional encoder and a convolutional decoder. The convolutional encoder-decoder is a network structure including pairs of a convolutional layer and a deconvolutional layer. FIG. 2 is a view showing a structure having five convolutional layers and five deconvolutional layers. The convolutional encoder includes a convolutional layer and a pooling layer. The convolutional decoder includes a deconvolutional layer and an unpooling layer.

The deconvolutional layer performs the inverse operation of the convolutional layer. The deconvolutional layer performs a convolution operation in a direction opposite to the convolutional layer. The deconvolutional layer receives a feature map as an input and generates an output video through a convolution operation using a kernel. When the stride is set to 1, the deconvolutional layer outputs a video in which the horizontal and vertical lengths of the feature map are the same as those of the output. When the stride is set to 2, the deconvolutional layer outputs a video half the size of the horizontal and vertical lengths of the feature map.

The unpooling layer performs upsampling in a direction opposite to the pooling layer. Unlike the pooling layer, the unpooling layer performs a function of expanding the dimension on the contrary.

The learning network may predict the wind vector based on video interpolation. In addition, the learning network may predict the wind vector based on video extrapolation. (1) Video interpolation is a method of estimating a current video from the past and future videos. For example, video interpolation may predict and generate a frame of time point t when frames of time point t−1 and t+1 are given. (2) Video extrapolation is a method of predicting a future video from the past and current videos. For example, video extrapolation may predict and generate a frame of time point t when frames of time point t−2 and t−1 are given. The video interpolator and video extrapolation methods may be used for prediction on a continuous frame.

On the other hand, a model that receives a video of time point t and predicts a video of time point t+1 is referred to as a forward prediction model. Contrarily, a model that receives a video of time point t+2 and predicts a video of time point t+1 is referred to as a backward prediction model.

Although the direction of time to predict the forward prediction model is opposite to that of the backward prediction model, the model structures may be the same or similar.

Figure 3:
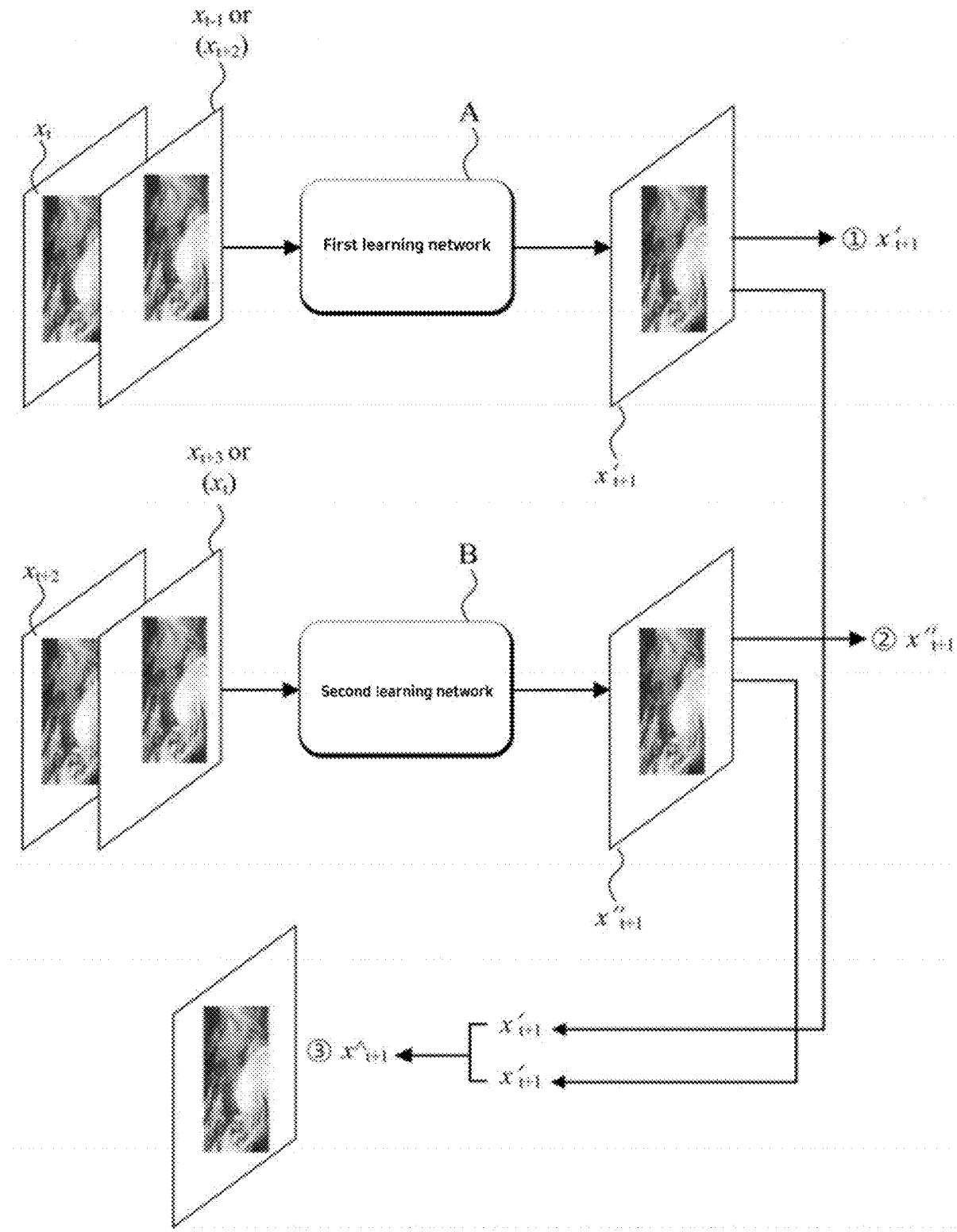
FIG. 3 is a view showing an example of a wind vector prediction process using a learning network.

FIG. 3 is a view showing an example of a wind vector prediction process using a learning network. In FIG. 3, the first learning network A corresponds to the forward prediction model, and the second learning network B corresponds to the backward prediction model. In FIG. 3, x denotes a video, and subscript t denotes a time point. For convenience of explanation, a case of generating a video of time point t+1 will be described.

The analysis device may input video $x_t$ of time point t and video $x_{t-1}$ of time point t−1 into the first learning network A to generate video $x'_{t+1}$ of time point t+1. The analysis device may output video $x'_{t+1}$ as a result of wind vector prediction (①). In this case, the first learning network A is a model based on video extrapolation. On the other hand, the analysis device may input video $x_t$ of time point t and video $x_{t+2}$ of time point t+2 into the first learning network A to generate video $x'_{t+1}$ of time point t+1. The analysis device may output video $x'_{t+1}$ as a result of wind vector prediction. In this case, the first learning network A is a model based on video interpolation.

The analysis device may input video $x_{t+2}$ of time point t+2 and video $x_{t+3}$ of time point t+3 into the second learning network B to generate video $x''_{t+1}$ of time point t+1. The analysis device may output video $x''_{t+1}$ as a result of wind vector prediction (②). In this case, the second learning network B is a model based on video extrapolation. On the other hand, the analysis device may input video $x_{t+2}$ of time point t+2 and video $x_t$ of time point t into the second learning network B to generate video $x''_{t+1}$ of time point t+1. The analysis device may output video $x''t_{+1}$ as a result of wind vector prediction. In this case, the second learning network B is a model based on video interpolation.

Furthermore, the analysis device averages video $x'_{t+1}$ predicted using the first learning network A and video $x''_{t+1}$ predicted using the second learning network B to output video $x\hat{}_{t+1}$ as a result of wind vector prediction (③).

The first learning network and/or the second learning network may be implemented as a convolutional encoder-decoder structure as described above.

In addition, the first learning network and/or the second learning network may be implemented as a generative adversarial network (GAN). Describing based on the interpolation method, the generator receives two video frames and predicts and generates an interpolated video, and a discriminator compares the generated video with a video located between (in the middle of) the two video frames. A trained learning network generates an interpolated video for the two video frames.

In addition, the first learning network and/or the second learning network may be implemented as an adaptive convolution network (ACN). Describing based on the interpolation method, the ACN learns the kernel using the CNN and performs video prediction and pixel interpolation at the same time through end-to-end learning. For the ACN, kernel function K should be prepared in advance.

Hereinafter, the structure of the learning network (the first learning network and/or the second learning network) will be described. For convenience of explanation, it will be described based on video interpolation.

Figure 4:
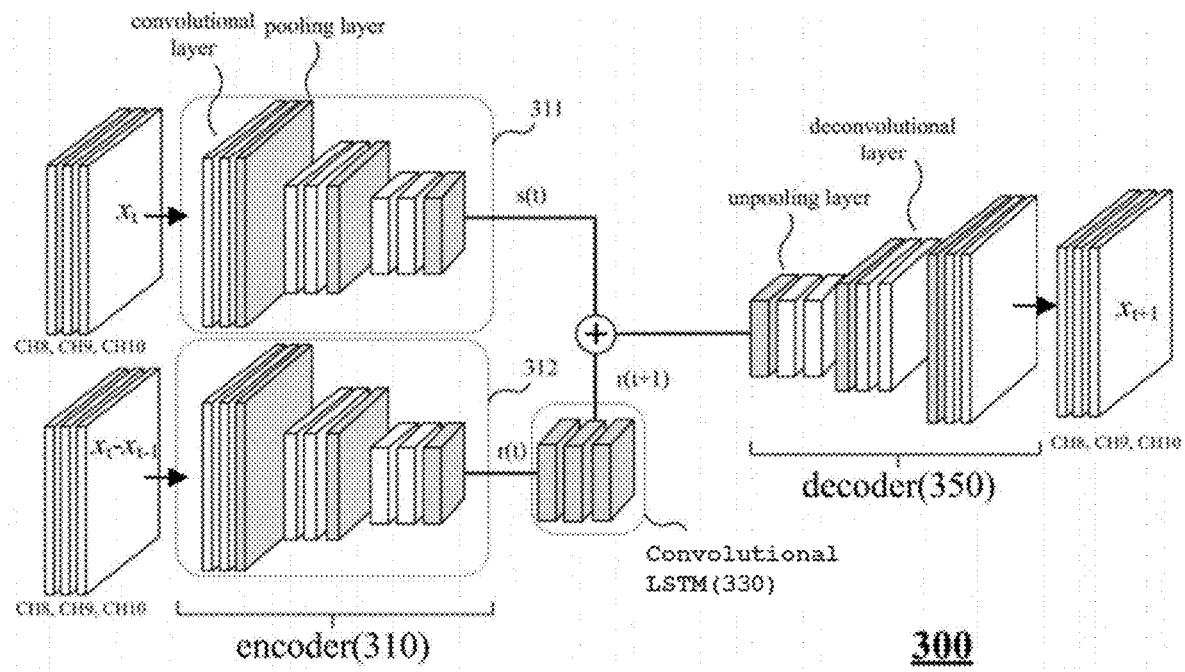
FIG. 4 is a view showing an example of the structure of a learning network.

FIG. 4 is a view showing an example of the structure of a learning network 300. The learning network 300 includes an encoder 310, a convolutional LSTM 330, and a decoder 350. The encoder 310 includes two sub-encoders 311 and 312. Each of the two sub-encoders is a CNN structure having a plurality of convolutional layers and a pooling layer. The two sub-encoders are named as a first sub-encoder 311 and a second sub-encoder 312, respectively. Each of the two sub-encoders may be configured of a plurality of convolutional layers, a pooling layer, and a nonlinear operation layer.

The first sub-encoder 311 receives video frame $x_t$ of time point t. At this point, the input data may be a video of at least one channel among a plurality of water vapor absorption channels. FIG. 4 is a view showing an example of inputting all of channel 8 (CH8), channel 9 (CH9), and channel 10 (CH10). That is, when channels 8, 9, and 10 are input, a video block of W×H×3 is input when the horizontal and vertical lengths of each channel are W and H.

The first sub-encoder 311 receives and processes video frame $x_t$ of time point t. The first sub-encoder 311 extracts feature map s(t) for the input video $x_t$. The video input into the first sub-encoder 311 is named as a base video. The learning network 300 may generate a next video (e.g., a next frame video) of the base video.

The second sub-encoder 312 receives a residual video of videos $x_t$ and $x_{t-1}$. At this point, the input data is the same as the channel video that the first sub-encoder 311 has received. FIG. 4 is a view showing an example of inputting all of channel 8 (CH8), channel 9 (CH9), and channel 10 (CH10). The second sub-encoder 312 generates feature map r(t) for an object (or region) having a movement in the original video. To this end, the second sub-encoder 312 should be trained in advance using the difference (residual video) between the frames of input video.

First, a long short-term memory (LSTM) will be described briefly. The RNN considers both the current input data and the past input data for learning. The RNN may be implemented as an LSTM. The LSTM is configured of a cell attached with several gates. A value to be stored or a time to export or delete information is determined by confirming the value or weight of a gate connected to the cell. Each cell improves learning performance by learning this weight value.

When the convolutional LSTM is used, video may be generated using the LSTM in the structure of the RNN that learns time series information. As the convolutional LSTM replaces the connection between the input and a hidden vector with a convolution filter, fewer parameters may be trained compared to the existing LSTM, and local features may be well reflected.

The convolutional LSTM 330 changes the feature vector output from the second sub-encoder 312 in a predetermined way in consideration of flow of time. The convolutional LSTM 330 changes the feature vector output from the second sub-encoder 312 according to flow of time using the LSTM in the structure of the RNN. To this end, the convolutional LSTM 330 should be previously trained with a movement or feature vector for a moving object in a continuous training frame. A more specific operation will be described below.

It is assumed that the video generation network 300 uses video frame (sequence) $x_{0:t-1}$. "0:t−1" means "time 0 to t−1". At this point, the residual video may be $y_{0:t-1}$.

The first sub-encoder 311 outputs feature vector $s_t$ from $x_t$ at each time point. The second sub-encoder 312 outputs feature vector $r_t$ from $y_t$ at each time point.

$$s_t, r_t \in \mathbb{R}^{f_b \times f_w \times f_c}.$$

$f_h$ denotes the height of the filter map, $f_w$ denotes the width of the filter map, and $f_c$ denotes the number of filter maps. In each convolutional layer, $f_w=w/2^\lambda$, and $f_h=h/2^\lambda$. $\lambda$ denotes the number of pooling layers. The filter size of each convolutional layer may be 3×3. The number of filter maps in the convolutional layer may be $64\times2^\lambda$. A transfer function such as Relu may be placed next to the pooling layer. In addition, the output feature vector may be normalized in a predetermined way. The second sub-encoder 312 may also have the same structure as the first sub-encoder 311.

The convolutional LSTM 330 converts feature vector r(t) output from the second sub-encoder 312 into estimated value r(t+1) of time point t+1. r(t+1) is a feature vector of a frame predicted according to flow of time based on video frames $x_t$ and $x_{t-1}$. The LSTM module receives r(t) while possessing information on memory cell $c_t$. In addition, the LSTM module updates information for prediction using the received information. The LSTM outputs r(t+1).

The decoder 350 receives a value obtained by summing the output vector $s_t$ of the first sub-encoder 311 and the output vector r(t+1) output from the convolutional LSTM 330. The decoder 350 reconstructs $s_t$+r(t+1) into a predetermined video. The decoder 350 outputs $x_{t+1}$. $x_{t+1}$ is a frame predicted to be placed next to $x_t$. FIG. 4 is a view showing an example of outputting a prediction video for three channels.

Figure 5:
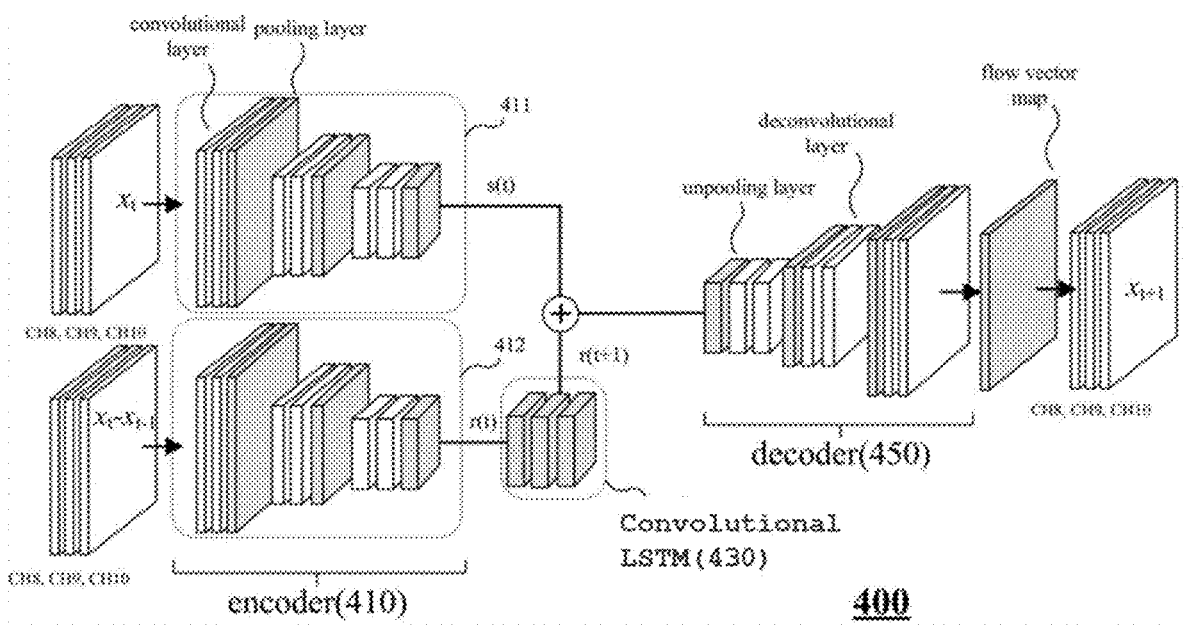
FIG. 5 is a view showing another example of the structure of a learning network.

FIG. 5 is a view showing another example of the structure of a learning network 400. The learning network 400 outputs a flow vector map, not a video. The learning network 400 includes an encoder 410, a convolutional LSTM 430, and a decoder 450. The encoder 410 includes two sub-encoders 411 and 412. Each of the two sub-encoders is a CNN structure having a plurality of convolutional layers and a pooling layer. The two sub-encoders are named as a first sub-encoder 411 and a second sub-encoder 412, respectively. Each of the two sub-encoders may be configured of a plurality of convolutional layers, a pooling layer, and a nonlinear operation layer.

The first sub-encoder 411 receives video frame $x_t$ of time point t. At this point, the input data may be a video of at least one channel among a plurality of water vapor absorption channels. FIG. 5 is a view showing an example of inputting all of channel 8 (CH8), channel 9 (CH9), and channel 10 (CH10). That is, when channels 8, 9, and 10 are input, a video block of W×H×3 is input when the horizontal and vertical lengths of each channel are W and H.

The first sub-encoder 411 receives and processes video frame $x_t$ of time point t. The first sub-encoder 411 extracts feature map s(t) for the input video $x_t$. The video input into the first sub-encoder 411 is named as a base video. The learning network 400 may generate a next video (e.g., a next frame video) of the base video.

The second sub-encoder 412 receives a residual video of videos $x_t$ and $x_{t-1}$. At this point, the input data is the same as the channel video that the first sub-encoder 411 has received. FIG. 5 is a view showing an example of inputting all of channel 8 (CH8), channel 9 (CH9), and channel 10 (CH10). The second sub-encoder 412 generates feature map r(t) for an object (or region) having a movement in the original video. To this end, the second sub-encoder 412 should be trained in advance using the difference (residual video) between the frames of input video.

When the convolutional LSTM is used, video may be generated using the LSTM in the structure of the RNN that learns time series information. As the convolutional LSTM replaces the connection between the input and a hidden vector with a convolution filter, fewer parameters may be trained compared to the existing LSTM, and local features may be well reflected.

The convolutional LSTM 430 changes the feature vector output from the second sub-encoder 412 in a predetermined way in consideration of flow of time. The convolutional LSTM 430 changes the feature vector output from the second sub-encoder 412 according to flow of time using the LSTM in the structure of the RNN. To this end, the convolutional LSTM 430 should be previously trained with a movement or feature vector for a moving object in a continuous training frame.

The convolutional LSTM 430 converts feature vector r(t) output from the second sub-encoder 412 into estimated value r(t+1) of time point t+1. r(t+1) is a feature vector of a frame predicted according to flow of time based on video frames $x_t$ and $x_{t-1}$. The LSTM module receives r(t) while possessing information on memory cell $c_t$. In addition, the LSTM module updates information for prediction using the received information. The LSTM outputs r(t+1).

The decoder 450 receives a value obtained by summing the output vector $s_t$ of the first sub-encoder 411 and the output vector r(t+1) output from the convolutional LSTM 430. The decoder 450 reconstructs $s_t$+r(t+1) as a predetermined flow vector map. The flow vector output from the decoder 450 means to which position a pixel of a video moves in another frame. The analysis device warps the pixels of the original channel video with the flow vector and uses it to configure a frame of a next time point. FIG. 5 is a view showing an example of generating video $x_{t+1}$ of time point t+1 by warping the flow vector to the original channel video for each of three channels.

Figure 6:
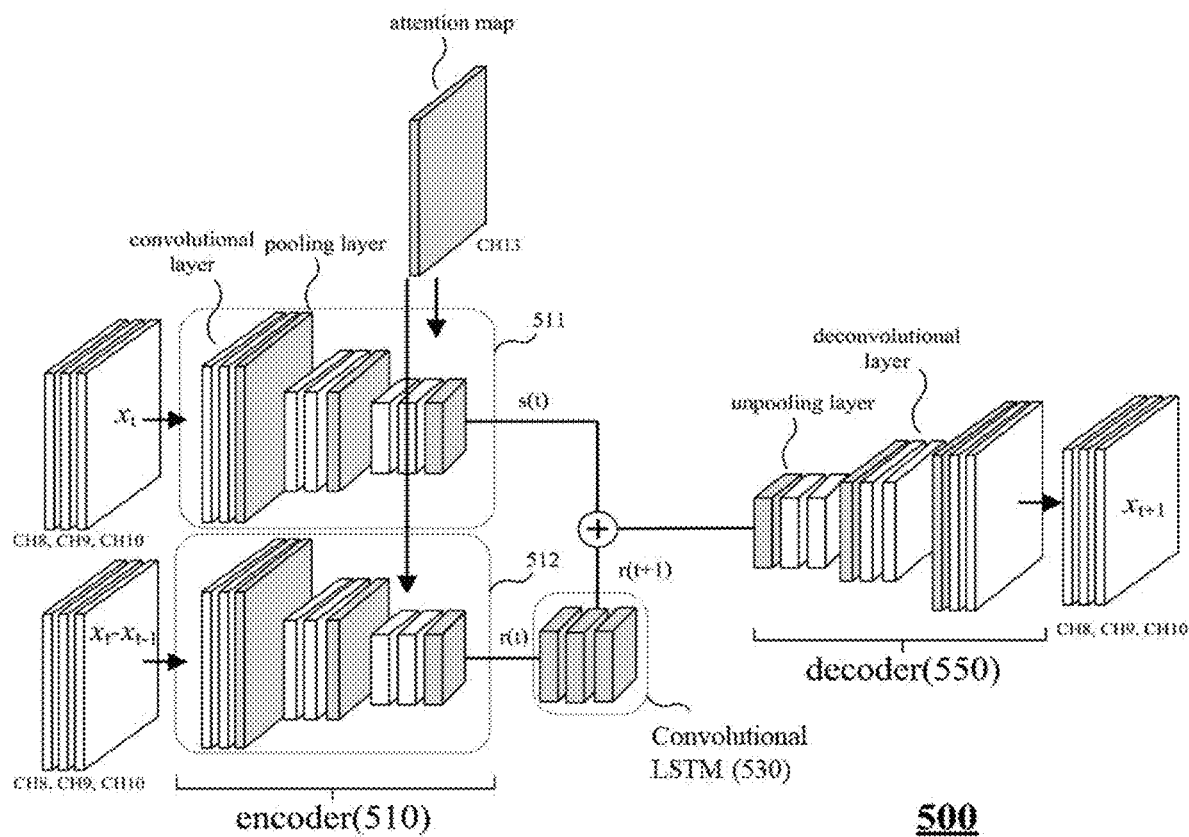
FIG. 6 is a view showing still another example of the structure of a learning network.

FIG. 6 is a view showing still another example of the structure of a learning network 500. The learning network 500 corresponds to an attention model. Attention refers to a process of selecting a region that should be more intensively analyzed when a deep learning model interprets input data. The method or structure of assigning attention may be diverse.

Attention may be assigned using channel 13. In channel 13, the radiance emitted from the ground reaches a satellite without being absorbed in the atmosphere. The ground temperature of an observation target can be estimated through the brightness temperature of the radiance. Therefore, the brightness temperature of channel 13 varies with and without clouds. The brightness temperature of channel 13 is relatively lower than that of a case without clouds. For example, a region where the brightness temperature is higher than the brightness temperature 285K of channel 13 may be defined as a clear sky region, and a region lower than 285K may be defined as a cloud region. That is, a cloud region may be intensively analyzed by assigning separate weights to the cloud region and the clear sky region using channel 13. FIG. 6 is a view showing an example using an attention map as an intermediate channel of a model.

The learning network 500 includes an encoder 510, a convolutional LSTM 530, and a decoder 550. The encoder 510 includes two sub-encoders 511 and 512. Each of the two sub-encoders is a CNN structure having a plurality of convolutional layers and a pooling layer. The two sub-encoders are named as a first sub-encoder 511 and a second sub-encoder 512, respectively. Each of the two sub-encoders may be configured of a plurality of convolutional layers, a pooling layer, and a nonlinear operation layer.

The first sub-encoder 511 receives video frame $x_t$ of time point t. At this point, the input data may be a video of at least one channel among a plurality of water vapor absorption channels. FIG. 6 is a view showing an example of inputting all of channel 8 (CH8), channel 9 (CH9), and channel 10 (CH10). That is, when channels 8, 9, and 10 are input, a video block of W×H×3 is input when the horizontal and vertical lengths of each channel are W and H.

The first sub-encoder 511 receives and processes video frame $x_t$ of time point t. The first sub-encoder 511 extracts feature map s(t) for the input video $x_t$. The video input into the first sub-encoder 511 is named as a base video. The learning network 500 may generate a next video (e.g., a next frame video) of the base video. At this point, the first sub-encoder 511 may focus on the cloud region using the attention map based on channel 13 as an intermediate channel.

The second sub-encoder 512 receives a residual video of videos $x_t$ and $x_{t-1}$. At this point, the input data is the same as the channel video that the first sub-encoder 511 has received. FIG. 6 is a view showing an example of inputting all of channel 8 (CH8), channel 9 (CH9), and channel 10 (CH10).

That is, the second sub-encoder 512 generates feature map r(t) for an object (or region) having a movement in the original video. To this end, the second sub-encoder 512 should be trained in advance using the difference (residual video) between the frames of input video. At this point, the second sub-encoder 512 may focus on the cloud region using the attention map based on channel 13 as an intermediate channel.

The convolutional LSTM 530 changes the feature vector output from the second sub-encoder 512 in a predetermined way in consideration of flow of time. The convolutional LSTM 530 changes the feature vector output from the second sub-encoder 512 according to flow of time using the LSTM in the structure of the RNN. To this end, the convolutional LSTM 530 should be previously trained with a movement or feature vector for a moving object in a continuous training frame.

The convolutional LSTM 530 converts feature vector r(t) output from the second sub-encoder 512 into estimated value r(t+1) of time point t+1. r(t+1) is a feature vector of a frame predicted according to flow of time based on video frames $x_t$ and $x_{t-1}$. The LSTM module receives r(t) while possessing information on memory cell $c_t$. In addition, the LSTM module updates information for prediction using the received information. The LSTM outputs r(t+1).

The decoder 550 receives a value obtained by summing the output vector $s_t$ of the first sub-encoder 511 and the output vector r(t+1) output from the convolutional LSTM 530. The decoder 550 reconstructs $s_t$+r(t+1) into a predetermined video. The decoder 550 outputs $x_{t+1}$. $x_{t+1}$ is a frame predicted to be placed next to $x_t$. FIG. 6 is a view showing an example of outputting a prediction video for three channels.

FIG. 6 is a view showing an example using an attention map as a channel of a learning network. Alternatively, input data may be configured using channel 13. For example, a value obtained by multiplying channel 8, channel 9 or/and channel 10, i.e., basic input data, by channel 13 in advance may be used as input data.

Figure 7:
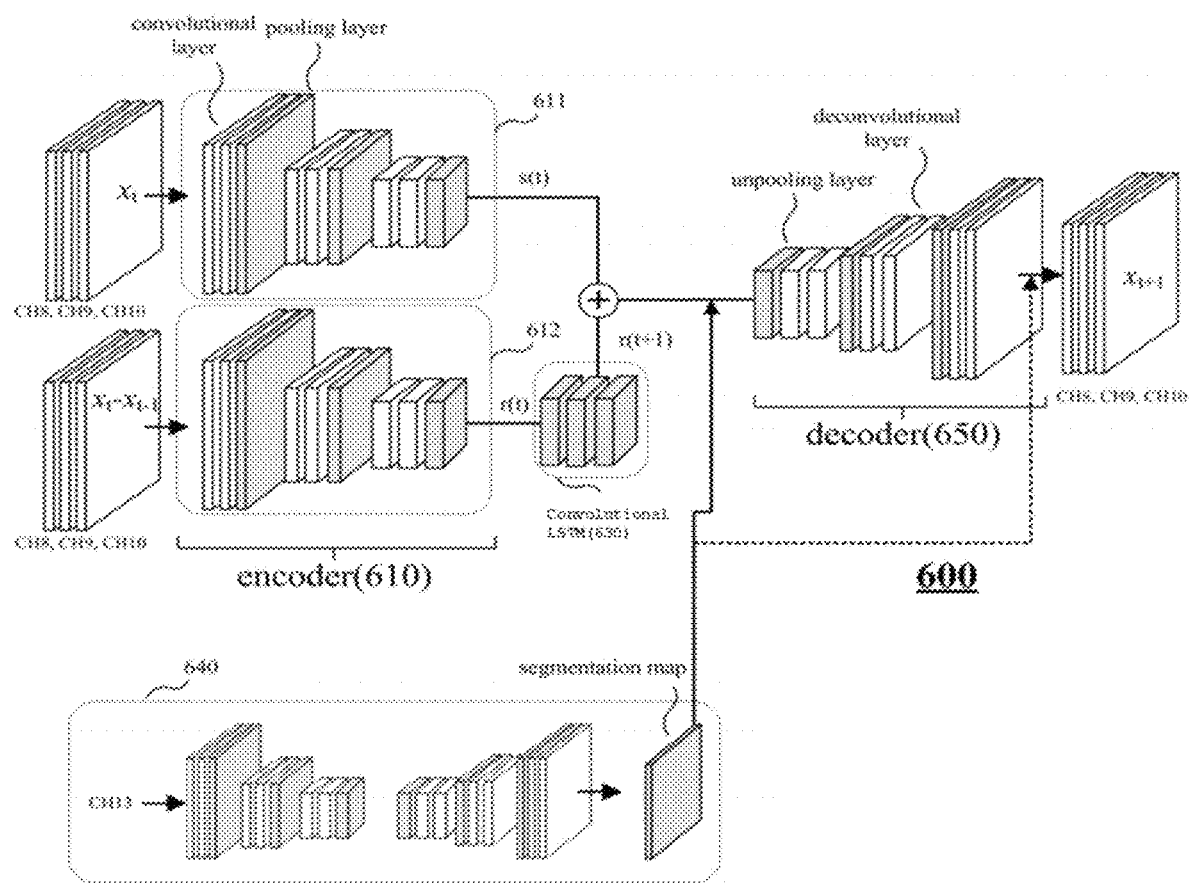
FIG. 7 is a view showing still another example of the structure of a learning network.

FIG. 7 is a view showing still another example of the structure of a learning network 600. FIG. 7 is a view showing an example using a segmentation map. Segmentation refers to a process of distinguishing a specific object or region in an input video. Various neural network models for segmentation have been studied. For example, segmentation may be performed using a convolutional encoder-decoder structure.

The learning network 600 includes an encoder 610, a convolutional LSTM 630, a segmentation neural network 640, and a decoder 650. The encoder 610 includes two sub-encoders 611 and 612. Each of the two sub-encoders is a CNN structure having a plurality of convolutional layers and a pooling layer. The two sub-encoders are named as a first sub-encoder 611 and a second sub-encoder 612, respectively. Each of the two sub-encoders may be configured of a plurality of convolutional layers, a pooling layer, and a nonlinear operation layer.

The first sub-encoder 611 receives video frame $x_t$ of time point t. At this point, the input data may be a video of at least one channel among a plurality of water vapor absorption channels. FIG. 7 is a view showing an example of inputting all of channel 8 (CH8), channel 9 (CH9), and channel 10 (CH10). That is, when channels 8, 9, and 10 are input, a video block of W×H×3 is input when the horizontal and vertical lengths of each channel are W and H.

The first sub-encoder 611 receives and processes video frame $x_t$ of time point t. The first sub-encoder 611 extracts feature map s(t) for the input video $x_t$. The video input into the first sub-encoder 611 is named as a base video. The learning network 600 may generate a next video (e.g., a next frame video) of the base video.

The second sub-encoder 612 receives a residual video of videos $x_t$ and $x_{t-1}$. At this point, the input data is the same as the channel video that the first sub-encoder 611 has received. FIG. 7 is a view showing an example of inputting all of channel 8 (CH8), channel 9 (CH9), and channel 10 (CH10).

That is, the second sub-encoder 612 generates feature map r(t) for an object (or region) having a movement in the original video. To this end, the second sub-encoder 612 should be trained in advance using the difference (residual video) between the frames of input video.

The convolutional LSTM 630 changes the feature vector output from the second sub-encoder 612 in a predetermined way in consideration of flow of time. The convolutional LSTM 630 changes the feature vector output from the second sub-encoder 612 according to flow of time using the LSTM in the structure of the RNN. To this end, the convolutional LSTM 630 should be previously trained with a movement or feature vector for a moving object in a continuous training frame.

The convolutional LSTM 630 converts feature vector r(t) output from the second sub-encoder 612 into estimated value r(t+1) of time point t+1. r(t+1) is a feature vector of a frame predicted according to flow of time based on video frames $x_t$ and $x_{t-1}$. The LSTM module receives r(t) while possessing information on memory cell $c_t$. In addition, the LSTM module updates information for prediction using the received information. The LSTM outputs r(t+1).

The segmentation neural network 640 receives video data of channel 13 and distinguishes a cloud region and a clear sky region. The segmentation neural network 640 outputs a segmentation map.

FIG. 7 is a view showing an example of applying a segmentation map to a decoder stage. The decoder 650 receives a value obtained by summing the output vector $s_t$ of the first sub-encoder 611 and the output vector r(t+1) output from the convolutional LSTM 630. The decoder 650 may output information for predicting a wind vector based on a cloud region using the segmentation map. The decoder 650 reconstructs $s_t$+r(t+1) into a predetermined video. The decoder 650 outputs $x_{t+1}$. $x_{t+1}$ is a frame predicted to be placed next to $x_t$. FIG. 7 is a view showing an example of outputting a prediction video for three channels.

That is, the analysis device calculates a wind vector based on an obtainable video for a clear sky region, and predicts the wind vector using the learning network described above only for a cloud region.

Figure 8:
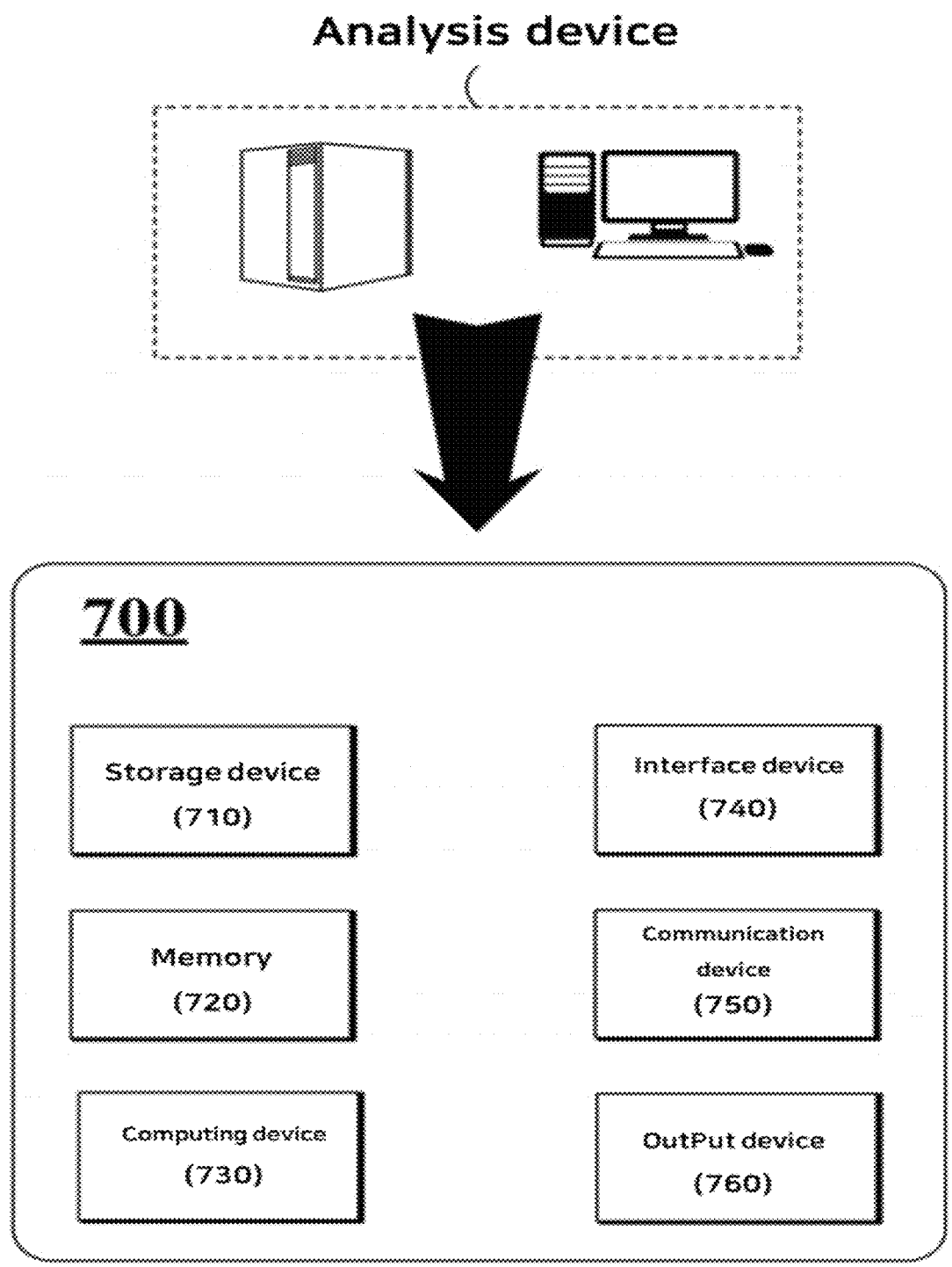
FIG. 8 is a view showing an example of the configuration of an analysis device.

FIG. 8 is a view showing an example of the configuration of an analysis device 700. The analysis device 700 is a device for predicting a wind vector using the satellite video described above. The analysis device 700 may be implemented in various forms physically. For example, the analysis device 700 may have a form of a computer device such as a PC, a server on a network, a chipset dedicated to video processing, or the like. The computer device may include a mobile device such as a smart device or the like.

The analysis device 700 includes a storage device 710, a memory 720, a computing device 730, an interface device 740, a communication device 750, and an output device 760.

The storage device 710 stores a learning network for video processing. For example, the storage device 710 may store the learning network described above to predict a wind vector. The stored learning network is a model trained in advance. Furthermore, the storage device 710 may store a program or a source code needed for video processing. The storage device 710 may store input videos, output videos, and flow vectors.

The memory 720 may store input videos and data and information generated during a video generation process.

The interface device 740 is a device for receiving predetermined commands and data from the outside. The interface device 740 may receive satellite videos (water vapor absorption channel and atmospheric window infrared channel) from a physically connected input device or an external storage device. The interface device 740 may receive various neural network models for video processing. The interface device 740 may receive training data, information, and parameter values for generating a neural network model.

The communication device 750 means a configuration that receives and transmits predetermined information through a wired or wireless network. The communication device 750 may receive satellite videos (water vapor absorption channel and atmospheric window infrared channel) from an external object. The communication device 750 may also receive various neural network models and data for model learning. The communication device 750 may transmit the generated information to the external object.

The communication device 750 and the interface device 740 are devices for receiving predetermined data or commands from the outside. The communication device 750 and the interface device 740 may be named as input devices.

The computing device 730 predicts a wind vector using a learning network or program stored in the storage device 710. The computing device 730 may preprocess satellite videos in a predetermined way as described above. The computing device 730 may learn a neural network model used in video processing by using given training data.

The computing device 730 may input an input video into the learning network and output information (a video or a flow vector) for predicting a wind vector. The computing device 730 may generate a video representing the wind vector by applying the flow vector to the original video. The computing device 730 may be a device such as a processor, an AP, or a chip embedded with a program, which processes data and performs a predetermined operation.

The output device 760 may output an interface screen of a process for analyzing the wind vector. The output device 760 may output predicted wind vector information (a video or the like).

In addition, the wind vector prediction method as described above may be implemented as a program (or application) including an executable algorithm that can be executed in a computer. The program may be stored and provided in a transitory or non-transitory computer-readable medium.

The non-transitory computer-readable medium means a medium that stores data semi-permanently and can be read by a device, rather than a medium that stores data for a short moment, such as a register, cache, or memory. Specifically, various applications or programs described above may be stored and provided in a non-transitory computer-readable medium such as a CD, DVD, hard disk, Blu-ray disk, USB, memory card, read-only memory (ROM), programmable read only memory (PROM), Erasable PROM (EPROM), Electrically Erasable PROM (EEPROM), or flash memory.

The transitory computer-readable media mean a variety of RAMs such as Static RAM (SRAM), dynamic RAM (DRAM), synchronous DRAM (SDRAM), double data rate SDRAM (DDR SDRAM), enhanced SDRAM (ESDRAM), synchronous DRAM (Synclink DRAM, SLDRAM), and direct Rambus RAM (DRRAM).

This embodiment and the drawings attached in this specification only clearly show part of the spirit included in the technique described above, and it is apparent that all modified examples and specific embodiments that can be easily inferred by those skilled in the art within the scope of the spirit included in the specification and drawings of the technique described above are included in the scope of the technique described above.

What is claimed is:

1. A wind vector prediction method comprising the steps of:
   receiving, by an analysis device including a processor and a memory, a weather video;
   inputting, by the analysis device, a first base video of a first time point for at least one water vapor absorption channel among a plurality of water vapor absorption channels included in the weather video and a reference video of a time point different from the first time point into a first learning network; and
   predicting, by the analysis device, a wind vector of a second time point for the at least one water vapor absorption channel based on information output from the first learning network, the second time point for the at least one water vapor absorption channel being after the first time point for the at least one water vapor absorption channel,
   wherein the first learning network is a learning network that outputs video information of the second time point using the first base video and the reference video,
   wherein the first learning network comprises:
   a first encoder for receiving the first base video, and generating a first feature map;
   a second encoder for receiving a residual video of the first base video and the reference video, and generating a second feature map;
   a convolutional long short-term memory (LSTM) for receiving the second feature map, and generating a third feature map of the second time point; and
   a decoder for receiving a value obtained by summing the first feature map and the third feature map, and generating information on the wind vector, and
   wherein the first learning network uses the first base video of the first time point for a channel indicating ground radiance to generate an attention map identifying a cloud region, the attention map being analyzed in at least one of the first encoder, the second encoder or the convolutional long short-term memory (LSTM) of the first learning network by assigning separate weights to cloud regions and cloudless regions identified from spectral difference.

2. The method of claim 1, wherein the reference video is a video of the first base video of a past time point, and the first learning network predicts the wind vector based on a difference between the first base video and the reference video, or the reference video is a video of the first base video of a future time point, and the first learning network predicts the wind vector of a time point between the first base video and the reference video based on the difference between the first base video and the reference video.

3. The method of claim 1, further comprising the steps of:
predicting, by the analysis device, the wind vector of the second time point by inputting a second base video of a third time point after the second time point in the at least one water vapor absorption channel and the reference video into a second learning network; and
predicting, by the analysis device, a final wind vector by averaging the wind vector predicted based on the first base video and the wind vector predicted based on the second base video.

4. The method of claim 1, wherein the first learning network is any one among a generative adversarial network (GAN), an adaptive convolution network (ACN), and a convolutional encoder-decoder.

5. The method of claim 1, wherein the information output from the first learning network is a video for the wind vector or a flow vector for the wind vector.

6. The method of claim 1, wherein the attention map is generated using a segmentation network including a convolutional encoder-decoder trained to segment cloud regions based on spectral differences between the ground radiance channel and the water vapor absorption channel.

7. A wind vector prediction method comprising the steps of:
receiving, by an analysis device including a processor and a memory, a video of a channel indicating a ground radiance and a video of a water vapor absorption channel;
inputting, by the analysis device, the video of the channel indicating the ground radiance into a segmentation network including a convolutional encoder-decoder to distinguish a cloud region and a cloudless region in the video of the water vapor absorption channel;
generating, using the segmentation network by the analysis device, a segmentation map including a wind vector for the cloudless region using the video of the water vapor absorption channel;
inputting, by the analysis device, a first base video of a first time point for the water vapor absorption channel and a reference video of a time point different from the first time point into a first learning network; and
predicting, by the analysis device, a wind vector of a second time point after the first time point based on information output from the first learning network,
wherein the first learning network is a learning network that outputs video information of the second time point using the first base video and the reference video,
wherein the first learning network comprises:
a first encoder for receiving the first base video, and generating a first feature map;
a second encoder for receiving a residual video of the first base video and the reference video, and generating a second feature map;
a convolutional long short-term memory (LSTM) for receiving the second feature map, and generating a third feature map of the second time point; and
a decoder for receiving a value obtained by summing the first feature map and the third feature map, and generating information on the wind vector, and
wherein the first learning network uses the segmentation map as an attention map identifying the cloud region, the attention map being analyzed in at least one of the first encoder, the second encoder, the convolutional long short-term memory (LSTM), or the decoder of the first learning network by assigning separate weights to cloud regions and cloudless regions identified from spectral difference.

8. The method of claim 7, wherein the first learning network performs interpolation prediction or extrapolation prediction.

9. The method of claim 7, further comprising the steps of:
predicting, by the analysis device, the wind vector of the second time point by inputting a second base video of a third time point after the second time point and the reference video in the water vapor absorption channel into a second learning network including a convolutional encoder-decoder; and
predicting, by the analysis device, a final wind vector by averaging the wind vector predicted based on the first base video and the wind vector predicted based on the second base video.

10. An analysis apparatus for predicting a wind vector using an artificial intelligence network, comprising:
an input device for receiving an input of a first base video of a first time point for at least one water vapor absorption channel and a reference video of a time point different from the first time point;
a storage device for storing a learning network that outputs video information of a second time point using the first base video and the reference video; and
a computing device including a processor and a memory for inputting the first base video and the reference video into the learning network including a convolutional encoder-decoder, and predicting a wind vector of the second time point after the first time p oint for the at least one water vapor absorption channel based on output information,
wherein the learning network performs interpolation prediction or extrapolation prediction, and
wherein the first learning network comprises:
a first encoder for receiving the first base video, and generating a first feature map;
a second encoder for receiving a residual video of the first base video and the reference video, and generating a second feature map;
a convolutional long short-term memory (LSTM) for receiving the second feature map, and generating a third feature map of the second time point; and
a decoder for receiving a value obtained by summing the first feature map and the third feature map, and generating information on the wind vector, and
wherein the first learning network uses the first base video of the first time point for a channel indicating ground radiance to generate an attention map identifying a cloud region, the attention map being analyzed in at least one of the first encoder, the second encoder or the convolutional long short-term memory (LSTM) of the first learning network by assigning separate weights to cloud regions and cloudless regions identified from spectral difference.

\* \* \* \* \*